Sept. 30, 1947.   H. B. FUGE   2,428,327

COMBINED SELSYN RECEIVER-TRANSMITTER UNIT

Filed May 8, 1944   2 Sheets-Sheet 1

Inventor
Harry B. Fuge
By William P. Stewart
Attorney

Witness:
Godfrey Peine

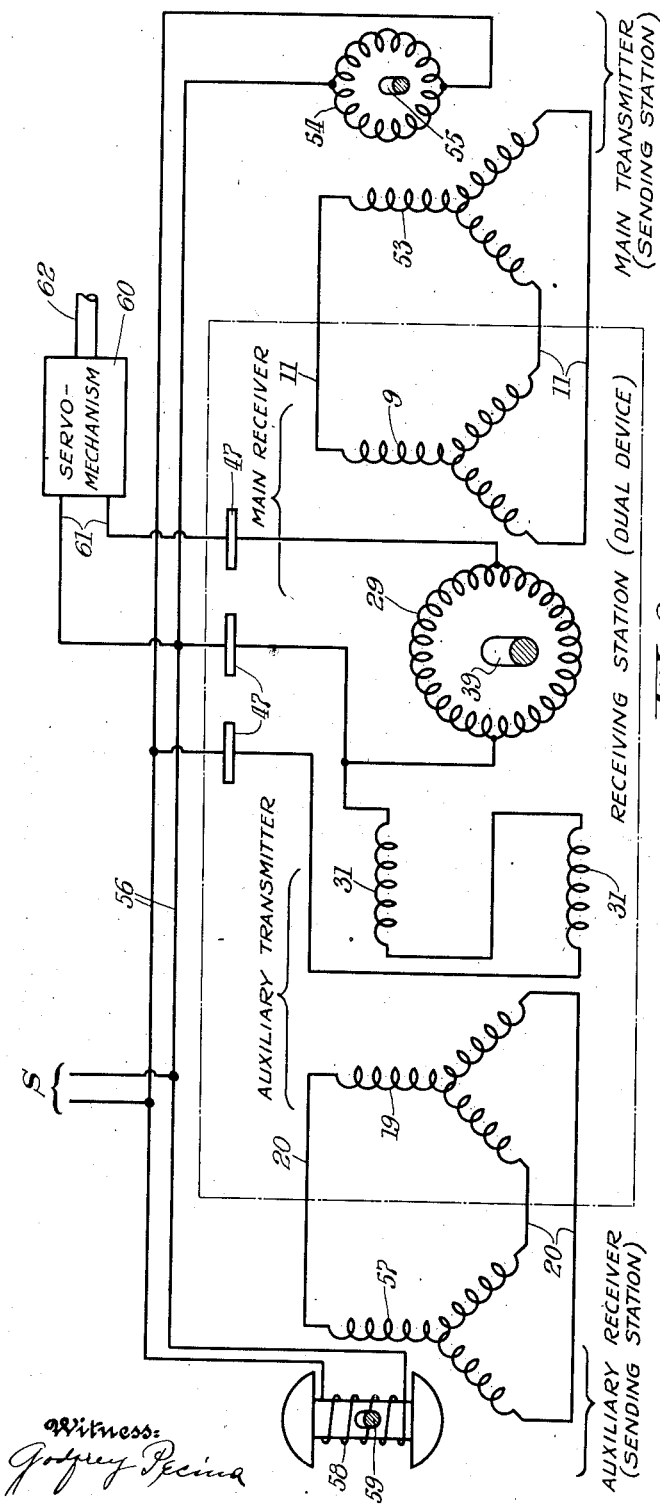

Patented Sept. 30, 1947

2,428,327

UNITED STATES PATENT OFFICE 2,428,327

COMBINED SELSYN RECEIVER-TRANSMITTER UNIT

Harry B. Fuge, Somerville, N. J., assignor to The Singer Manufacturing Company, Elizabeth, N. J., a corporation of New Jersey Application May 8, 1944, Serial No. 534,615

4 Claims. (Cl. 172—36)

This invention relates to dynamo-electric machines, and particularly to motors and generators of the type adapted to be electrically interconnected in self-synchronous systems for the transmission of angular motion.

A conventional self-synchronous system comprises a generator or transmitter device electrically connected to a motor or receiver device. Such a system functions to reproduce synchronously at the receiver the mechanical motion imparted to the transmitter. It is often desirable or imperative in such systems that some acknowledgment be received at the transmitter that the input motion has actually been reproduced by the receiver. Heretofore this acknowledging function has been performed by adding to the above system an auxiliary transmitter device mechanically coupled to the main receiver and electrically connected to an auxiliary receiver device located adjacent the main transmitter.

I have found it disadvantageous, from the standpoint of space requirements and the efficient use of materials, to employ a separate device for transmitting an acknowledging signal and have accordingly provided a novel receiver unit which incorporates, in one housing, means for performing the dual functions of the main receiver and the acknowledging transmitter.

It is, therefore, an object of my invention to provide, in a unitary dynamo electric machine structure, means for reproducing the movement of a device located at a remote point and for initiating an electrical acknowledging signal that such movement has been reproduced.

With the above and other objects in view as will hereinafter appear, the invention comprises the combinations and arrangements of parts hereinafter set forth and illustrated in the accompanying drawings of the invention from which the several features of the invention and the advantages attained thereby will be readily understood by those skilled in the art.

In the drawings,

Fig. 3 is a schematic illustration of the invention applied to an electrical control system of the self-synchronous type.

Figure 1:
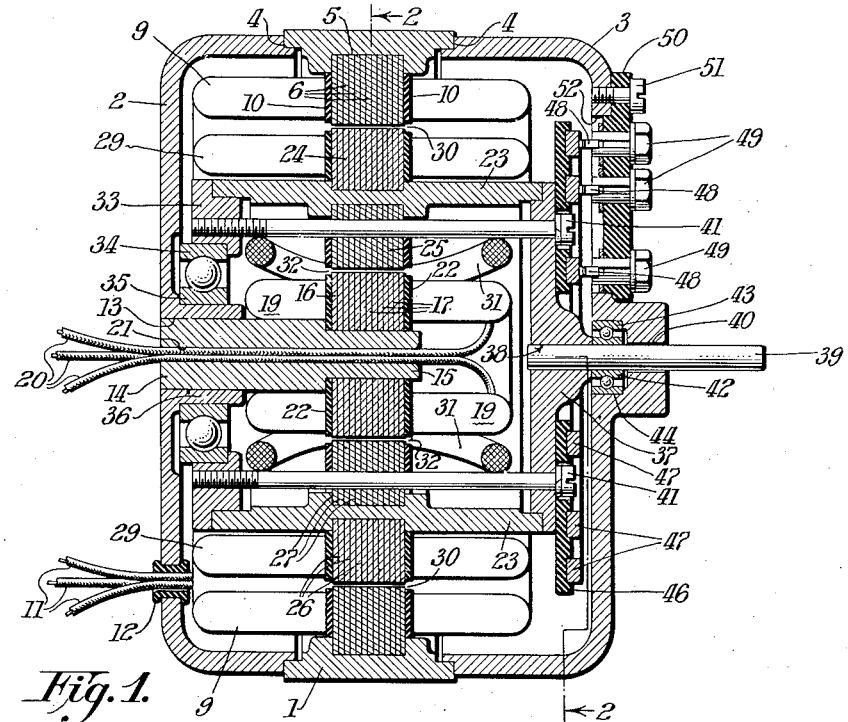
Fig. 1 is a central longitudinal section of a dynamo electric machine embodying the invention.

Referring to the drawings, the invention is shown embodied in a machine comprising an annular housing 1, generally closed at the ends by end-bells 2 and 3, each of which is provided with an annular shouldered portion 4 for the reception of the housing 1. The housing 1 is preferably die cast of non-magnetic material and contains, as an integrally cast-in element, an annular stator core 5 made up of axially-stacked magnetic laminations 6 having the usual radial slot and tooth portions 7 and 8 respectively. A polyphase winding 9 is received in the slot portions 7 and is insulated from the end portions of the core 5 by the insulation pieces 10—10. Leads 11 extending through insulated bushing 12 in end-bell 2 serve to connect winding 9 with an external circuit.

Pressed within a central apertured portion 13 of end-bell 2 is a cylindrical stud 14 extending inwardly of said end-bell and terminating in a cylindrical portion 15 of reduced diameter. A second stator core 16 comprising axially-stacked magnetic laminations 17 is secured upon said cylindrical portion 15 and carries, within slot portions 18 in said laminations, a polyphase winding 19 which may be electrically connected to an external circuit by means of leads 20 carried within a central apertured portion 21 of stud 14. Insulation pieces 22—22 serve to insulate winding 19 from the end portions of core 16 in a manner well known to the art.

It will be noted that the structure just described defines a dual stator having an annular air gap of considerable radial extent. Located within said air gap and free to rotate therewithin is a rotor now to be described.

An annular spider 23, preferably formed of non-magnetic die-cast metal, carries, as integrally cast-in elements, magnetic cores 24 and 25 formed of axially-stacked magnetic laminations 26 and 27 respectively. The outer rotor core 24 carries, within slot portions 28, a distributed winding 29 arranged to be linked by flux sent across air gap 30 by current in the stator winding 9.

The laminations 27 of the inner rotor core 25 present a salient bipolar structure carrying thereupon current-conducting coils 31 which are linked by flux sent across air gap 32 by current in the stator winding 19.

The windings 9 and 29, electro-magnetically coupled across the air gap 30, constitute elements of a main receiver and windings 19 and 31, magnetically coupled across the air gap 32, form components of an auxiliary transmitter of the dual device.

Pressed within one end of the spider 23 is an apertured hub member 33 which is mounted upon outer race-ring 34 of a ball bearing whose inner race-ring 35 is carried upon an inturned annular portion 36 of the end-bell 2.

At the other end of spider 23 is a disc-like member 37 containing a central apertured portion 38 which receives, in pressed engagement therewith, a stub shaft 39 which extends externally of end-bell 3 through an apertured portion thereof. The stub shaft 39 is secured within an inner race ring 42 of a ball bearing having an outer race ring 43 received within a recessed portion 44 of the end-bell 3.

Members 33 and 37 are drawn inwardly against the ends of the spider 23 by means of bolts 41 and form therewith a rotor structure positioned for rotation about the central axis of the stud 14.

Secured against the outer face of member 37, by means of screws 45 (Fig. 2), is a circular disc 46 of insulating material in which are partially embedded concentric annular slip rings 47 of electrically conducting material. Stationary brushes 48, bearing on the slip rings 47, are carried by conducting stud bolts 49 extending through an insulated brush-holder plate 50 and afford means for electrically connecting the rotor windings to external circuits. It is understood that the rotor windings 29 and 31 are connected electrically to the slip rings 47 as indicated diagrammatically in Fig. 3.

The brush-holder plate 50 is removably secured to end-bell 3 by means of screws 51 and forms a cover for apertured portion 52 of said end-bell.

Having thus described the parts entering into the novel construction herein disclosed, the operation thereof will now be explained with reference to their application to a control system comprising a sending station adapted to transmit signals to a receiving station. For the sake of illustration only, the invention is diagrammatically shown in Fig. 3 as applied to a system of this general character.

As illustrated therein, such a system may include the provision, at the sending station, of a dynamo-electric machine of the self-synchronous type having a stationary armature carrying a polyphase winding 53 and a rotatable field carrying winding 54. This arrangement constitutes a transmitter device and the motions desired to be reproduced at a receiving station are imparted to shaft 55 thereby to rotate 54 relative to 53. Field winding 54 is electrically connected to a source of single-phase alternating current S by means of conductors 56. Also located at the sending station is a second dynamo-electric machine of the self-synchronous type comprising a stationary armature carrying a polyphase winding 57 and a rotatable field carrying a winding 58. This second machine constitutes an auxiliary receiver device and signals received by it from the auxiliary transmitter in the receiving station are transformed electromagnetically into angular motion of shaft 59 which turns with the field winding 58.

Field winding 58 is connected electrically, as shown, to the source of single-phase alternating current S by means of conductors 56 and to the rotor winding 31 by way of slip rings 47 of the dual device hereinbefore described and located at the receiving station.

Armature winding 53 is connected electrically by means of conductors 11 to stator winding 9 of the dual device. Similarly, armature winding 57 is electrically connected to stator winding 19 of the dual device by means of conductors 20.

Figure 2:
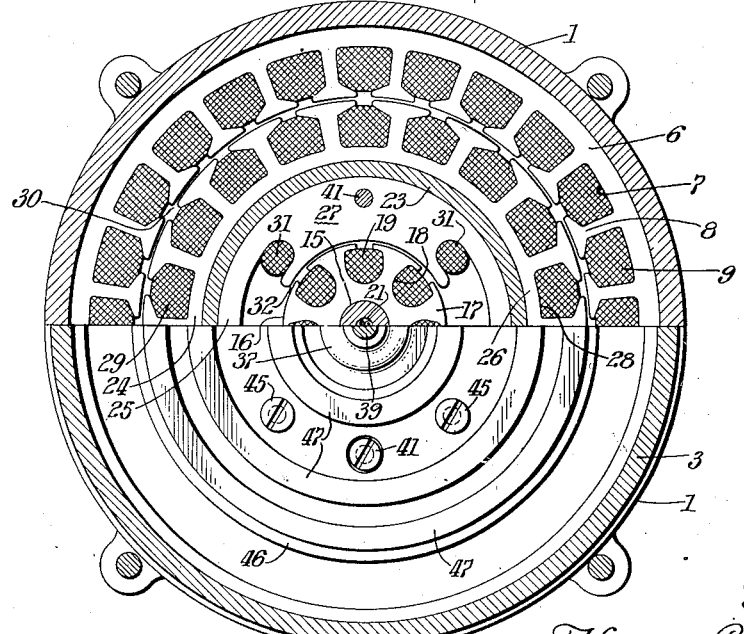
Fig. 2 is a transverse sectional view of said machine taken along line 2—2 of Fig. 1.

Rotor winding 29 of the dual device illustrated in Figs. 1 and 2 is connected to a servo-mechanism 60 by means of slip rings 47 and conductors 61. Servo-mechanism 60 may be any one of several well known in the art and functions to translate a voltage at its terminals into a mechanical shaft rotation of predetermined direction. That is to say, a voltage appearing at conductors 61 causes shaft 62 to rotate. It is to be understood that the torque output of shaft 62 is limited only by the power-handling capability of the servo-mechanism 60. This permits a heavy load to be synchronously controlled by the application of the small input torques of hand operation.

Shaft 62 is mechanically connected either directly or through suitable gearing to shaft 39 of the dual device, which shaft reproduces at the receiving station the desired angular control movement imparted to the shaft 55 at the sending station in a manner now to be described.

With the foregoing construction in mind, rotation imparted to shaft 55 will turn winding 54 relative to winding 53 causing an electro-magnetic reaction between said windings which induces a voltage in winding 9 of the dual device. This voltage induces a similar voltage in rotor winding 29 which voltage is applied to servo-mechanism 60 by way of conductors 61 causing shaft 62 to drive shaft 39 and thus to rotate winding 29 into such a position as to reduce the voltage in winding 29 to zero due to the altered electro-magnetic reaction between windings 29 and 9. The relation of the parts may be made such that when zero voltage appears in winding 9 the shaft 39 will have moved through an angular distance equal or proportional to that imparted to shaft 55 at the sending station.

When the rotor shaft 39 of the dual device is rotated as described above, a voltage will be induced in stator winding 19 due to electro-magnetic reaction with winding 31 which is excited by the single phase alternating current from source S. This voltage is applied to winding 57 causing a current to flow therein which reacts on the current in winding 58 producing an electro-magnetic torque applied to shaft 59 thereby to turn it synchronously with the motion of shaft 39 in a manner well known in the self-synchronous machine art. The shaft 59 may carry an indicator which thus moves to acknowledge visually at the sending station that the control movement imparted to shaft 55 has actually been reproduced, as desired, by shaft 39 at the receiving station.

It is clear that the rotor windings 29 and 31 of the dual device must be electro-magnetically independent to permit independent reactions with their respective associated stator windings across separate and distinct air gaps.

While the arrangement shown provides but three slip rings 47 due to the common connection between the windings 31 and 29 it is clearly within the limits of the broad inventive concept herein disclosed to provide four such slip rings to completely isolate the circuits containing windings 31 and 39 when desirable.

From the foregoing it will be perceived that I have provided a compact unitary dynamo-electric machine structure by means of which may be performed the dual function of reproducing the motion of a transmitter and of producing an acknowledging signal to be sent back to the transmitter as proof that said motion has in fact been reproduced.

It is to be understood that various other changes may be made in the construction, arrangement and interrelation of the parts constituting the invention without departing from the spirit thereof; and although only one embodiment of the invention has been illustrated, the same is not limited to the form shown. Reference will therefore be had to the appended claims for a definition of the limits of the invention.

Having thus set forth the nature of the invention, what I claim herein is:

1. A combined electrical receiving and transmitting device of the self-synchronous type, comprising a stator carrying two relatively stationary electromagneticaly independent current-carrying windings radially spaced from each other to provide therebetween an annular air gap, and a single rotor positioned to rotate within said air gap and provided with two magnetically independent current-carrying windings, said rotor windings being respectively linked magnetically with different ones of said stator windings.

2. A dynamo-electric machine of the self-synchronous type, comprising relatively stationary outer and inner magnetic stator-core members concentrically arranged on a non-magnetic frame, and a single relatively rotatable intermediate non-magnetic member carrying two individual magnetic rotor-cores, said rotor-cores being magnetically insulated from each other and arranged concentrically to lie radially adjacent and to cooperate magnetically with different ones of said outer and inner stator-core members.

3. A self-synchronous dynamo-electric machine, comprising a non-magnetic stator frame, two relatively stationary magnetic core members positioned concentrically on said stator frame to form therebetween an annular air gap, and a single rotor positioned to rotate within said air gap and provided with two magnetically independent core members, said rotor-core members being positioned radially adjacent to respectively different ones of said stator-core members for magnetic cooperation therewith.

4. A dynamo-electric machine of the self-synchronous type having a pair of relatively rotatable members, the first of said members comprising a non-magnetic frame, two relatively stationary annular magnetic cores arranged concentrically on said frame to provide an air gap therebetween, and two current-carrying windings, each carried on a respective one of said cores and positioned adjacent said air gap; the second of said members comprising a single non-magnetic annular frame positioned within said air gap, two magnetically separated annular cores, each positioned concentrically on the respective outer and inner peripheries of said annular frame, and two current-carrying windings, each carried on a respective one of said second member cores and positioned to cooperate electro-magnetically with a different one of said first member windings.

HARRY B. FUGE.

REFERENCES CITED

The following references are of record in the file of this patent:

UNITED STATES PATENTS

| Number | Name | Date |
|---|---|---|
| 805,416 | Esmond | Nov. 21, 1905 |
| 912,144 | Mavor | Feb. 9, 1909 |
| 2,064,583 | Wolkoff | Dec. 15, 1936 |
| 1,873,171 | Zetsche et al. | Aug. 23, 1932 |
| Re. 16,667 | Hewlett et al. | July 5, 1927 |
| 925,504 | Forsche | June 22, 1909 |
| 2,223,210 | Hefel | Nov. 26, 1940 |
| 2,045,831 | Carbonara | June 30, 1936 |

FOREIGN PATENTS

| Number | Country | Date |
|---|---|---|
| 18,306 | Great Britain | 1910 |